Patented Feb. 2, 1943

2,310,087

UNITED STATES PATENT OFFICE 2,310,087

DYESTUFFS OF THE DIBENZANTHRONE SERIES

Edward T. Howell, Wilmington, Del., assignor to E. I. du Pont de Nemours & Company, Wilmington, Del., a corporation of Delaware No Drawing. Application August 9, 1940, Serial No. 351,959

8 Claims. (Cl. 260—353)

This invention relates to an improved process for the preparation of dyestuffs of the dibenzanthrone series. The invention relates more particularly to an improved process for effecting reduction and fusion of nitro dibenzanthrone compounds and the production of improved direct dyeing and printing black dyes.

The preparation of nitro dibenzanthrone compounds by nitration in various media is described in the literature. The resulting dyestuffs, however, dye cellulose fibers from the ordinary hydrosulfite vat in green shades which are converted on the fiber to black shades by means of relatively strong oxidizing agents. It is also known that the nitro or amino dibenzanthrone can be converted to direct black dyestuffs upon fusion with alkalies. See for instance U. S. 1,538,419. It was found that improved direct black dyestuffs could be produced from Bz1:Bz1′-dibenzanthronyls by fusing the nitro or amino derivatives of such dibenzanthronyls with caustic alkalies, as illustrated in U. S. 1,957,459.

It is the object of the present invention to provide a new and more economical procedure for converting nitro dibenzanthrone compounds to direct dyeing black vat dyestuffs. It is a further object of the invention to provide direct dyeing black dyestuffs of the dibenzanthrone series which exhibit improved dyeing and fastness properties over the black vat dyestuffs of this series heretofore described.

In this specification the expression "nitro-dibenzanthrone compounds" is used to refer to the nitro-dibenzanthrones, nitro-dibenzanthronyls and nitro-isodibenzanthrones.

I have found that direct dyeing black vat dyes of the dibenzanthrone series which exhibit improved dyeing properties can be produced from nitro dibenzanthrone compounds when the reduction of the nitro compound to the amino derivative and the caustic fusion of the amino derivative is carried out in alcoholic suspension without isolation of the amino derivatives. I have found that in some cases an increase in yield of as high as 27% may be obtained and that the resulting dyes exhibit increased build-up properties and often increased fastness properties, as well as an improvement in shade.

According to the present invention the nitro dibenzanthrone compound is reduced in alcoholic suspension by means of reducing agents such as metallic sodium, sodium or potassium sulfide, hydrogen sulfide, hydrogen in the presence of catalysts, or with metal powders and alkali, etc. Methyl alcohol, ethyl alcohol, isopropyl alcohol, secondary butyl alcohol or any of the alcohols which are liquid at ordinary temperatures may be employed as the reduction medium. Upon completion of the reduction of the nitro compounds to the corresponding amines, caustic alkali is added and the temperatures raised to a point where condensation occurs. This caustic fusion or condensation may be carried out under any of the conditions disclosed in the prior art for the preparation of black vat dyestuffs of this series. The use of low temperatures as more particularly described in U. S. 1,957,459 is preferred, where the amino Bz1:Bz1′-dibenzanthronyls are fused in the absence of oxidizing agents. The products are then isolated in the usual manner.

The following examples are given to illustrate the invention. The parts used are by weight.

Example 1

Fifty parts of a finely powdered nitro-dibenzanthrone, obtained by nitration of dibenzanthrone in acetic acid and containing 5.35% nitrogen, are suspended in 150 parts of isopropyl alcohol, and the temperature is adjusted to 50° C. Fifteen parts of metallic sodium in small pieces are added uniformly during a period of 3½ hours while the temperature is maintained at 50–55° C. The reduction mixture is heated at the reflux until a small sample in nitrobenzene gives a pure green color, adding a small additional amount of sodium if necessary in order to bring this about. When the reduction is complete the reaction mixture is cooled to about 50° C. and 175 parts of caustic potash flakes are added. The temperature is raised to 130° C., distilling off alcohol, 25 parts of sodium nitrite are added and the temperature is gradually raised to 210° C. and held at 210–15° C. for one hour with stirring. After allowing the melt to cool to the thickening point, 500 parts of water are added and the dilution mixture is allowed to stir with aeration until the dyestuff is completely precipitated. The product is isolated by diluting with much water, boiling, filtering, washing and drying. The product so obtained when pasted and made into a printing gum by known methods produces gray-black prints of excellent fastness to washing and good fastness to light and water spotting.

Example 2

100 parts of a nitro-dibenzanthrone, obtained as in Example 1 and containing approximately 5.62% nitrogen, are suspended in 300 parts of isopropyl alcohol. 36 parts of 60% sodium sulfide are added and the mixture is heated two hours under reflux. The reduction mass is cooled to 50° C., 50 parts of sodium acetate and 175 parts of caustic potash flakes are added and allowed to stir about ½ hour allowing the temperature to rise to about 80° C. 175 parts more of caustic potash flakes are added and the temperature is raised to 125° C. 80 parts of sodium nitrite are added and the temperature is gradually raised to 210° C. and is held at 210–215° C. for one hour with stirring. After isolation as in Example 1, the product so obtained when made into printing pastes by known means gives gray to black prints of somewhat redder shade than that of Example 1 and of good "built-up," good fastness to chlorine, washing, and water spotting on cotton and rayon fabrics.

In this example, if a nitrated dibenzanthrone containing 5.81% nitrogen obtained by the nitration of dibenzanthrone in orthodichloro-benzene, is employed, using 36 parts of 60% sodium sulfide, a printing black dyestuff is obtained which gives somewhat yellower shades of black.

In the first part of this example, if 250 parts of molten naphthalene are added after the sodium nitrite, and the mass is heated as before, steaming off the naphthalene after diluting the fusion mass with water, a product is obtained which may be used for printing textile fabrics as above and gives somewhat bluer shades of gray to black than obtained according to the first part of this example.

Example 3

50 parts of nitro-dibenzanthrone, containing 5.73% nitrogen obtained by the nitration of dibenzanthrone in acetic acid, are refluxed in 150 parts of secondary butyl alcohol with 18 parts of 60% sodium sulfide for two hours. The reduction mass is cooled to 25–30° C., 175 parts of caustic potash flakes are added and the temperature is gradually raised to 125° C. 40 parts of sodium nitrite are added and the temperature is raised during a period of about 3 hours to 210° and the temperature is maintained one hour at 210–215° C. with continued stirring. The product, which is isolated as in Example 2, is substantially identical in its properties to the product of Example 2.

Example 4

The procedure is carried out according to Example 2, but instead of 80 parts of sodium nitrite there are substituted 65 parts of sodium nitrate. The product obtained is substantially identical to that of Example 2.

Example 5

The procedure of Example 2 is carried out, substituting 65 parts of sodium chlorate in place of 80 parts of sodium nitrite. The product obtained gives greener shades of black than that of Example 2 when used as a printing black vat dyestuff.

Example 6

50 parts of nitro-iso-dibenzanthrone, containing 4.28% nitrogen, obtained by the nitration of iso-dibenzanthrone in ortho-dichloro-benzene, are refluxed for one hour in 150 parts of isopropyl alcohol with 16 parts of 60% sodium sulfide. The temperature is then lowered to 65° C. and 87.5 parts of caustic potash flakes are added. After the temperature no longer rises (to about 70° C.) another 87.5 parts of caustic potash flakes are added and the temperature is raised to 125° C. 40 parts of sodium nitrite are added, the temperature is raised to 210° C. and maintained at this point for one hour. The product, isolated as in Example 1, consists of a dark powder soluble in concentrated sulfuric acid with green color and giving powder blue to blue black shades when made up into a paste and printed onto textile fabrics by known methods.

Example 7

The procedure of Example 6 is carried out employing 50 parts of a nitrated iso-dibenzanthrone containing 4.46% nitrogen, obtained by nitrating iso-dibenzanthrone in acetic acid. The product thus obtained affords a somewhat greener shade than that of Example 6.

Example 8

50 parts of dinitro-2:2'-dibenzanthronyl obtained according to British Patent 512,189 are reduced to the amino compound by boiling for 1½ hours in 150 parts of methanol with 15 parts of 60% sodium sulfide. 87.5 parts of caustic potash flakes are then added, heating to 70° C. When this has dissolved 87.5 parts more of caustic potash are added and the temperature is gradually raised to 200°, distilling off methanol. The fusion mass is stirred one hour at 200–205° and is worked up as in Example 1. The product so obtained is useful for dyeing as well as for printing. The product exhibits very good fastness to washing and to light.

Example 9

In the above example, if 40 parts of sodium nitrite are added at a temperature of 140° while heating up to 200° C., the resulting product dyes in much bluer shades of gray to black than that of Example 8 and shows very good to excellent fastness to washing and to light.

Example 10

100 parts of dinitro-Bz-1:Bz-1'-dibenzanthronyl obtained according to Example 1 of U. S. Patent 1,957,459 are boiled for one hour under reflux in 300 parts of isopropyl alcohol with 36 parts of 60% sodium sulfide. The reduction mass is cooled to 55° C., 200 parts of caustic potash are added and the temperature raised to 90° C. and held for 5 hours. At the end of this time the fusion mass is diluted with water and worked up as in Example 1. The product which exhibits improved fastness to bleach and in build-up compared to that of Example 11 of U. S. Patent 1,957,459, is useful as a direct vat black dyestuff for both dyeing and printing.

Example 11

100 parts of dinitro-Bz-1:Bz-1'-dibenzanthronyl are treated according to the procedure of Example 10. At the end of the condensation and before the fusion is diluted, 75 parts of sodium nitrite are added followed by 100 parts of caustic potash flakes. The temperature is raised to 200° C. and held for 1 hour at that point. The mass is allowed to cool and is worked up as in Example 1. The product affords direct gray to black dyeings of much redder shade than that of Example 10, and of very good fastness to washing and to light.

If 80 parts of 85% manganese dioxide are substituted for 65 parts of sodium nitrite in the above procedure, and the manganese hydroxide is removed by filtering the vat, the resulting product gives gray to black dyeings of much yellower shade than that of Example 10, and of very good to excellent fastness to washing and to light.

Where an oxidizing agent is employed in the caustic fusion step it may be added before the mass is heated or after the temperature has been raised.

During the caustic fusion step various fluxes or diluents such as sodium or potassium acetate, sodium phenolate, and organic diluents such as naphthalene, kerosene, etc. may be employed.

The caustic potash may be replaced in part or entirely by caustic soda, although caustic potash is preferred since much higher yields are obtained where at least 50% of the caustic is caustic potash.

While it will be obvious that this process is applicable to the reduction and fusion of nitro dibenzanthrone compounds irrespective of whether they are mono-nitro- or poly-nitro' derivatives, the process is particularly suitable for preparing grey to black vat dyes from nitro dibenzanthrone compounds containing from 3.5 to 6.5% nitrogen.

The above described process materially reduces the cost of operation by eliminating one separation step but the increase in yield is far in excess of that which would ordinarily be obtained due to mechanical losses in the isolation of the amino dibenzanthrone compound. The increase in tinctorial strength and build-up properties of the dyestuffs is entirely unforeseen since ordinarily the mere combination of reactions in a particular solvent does not impart different dyeing properties to the dyestuff.

I claim:

1. The process for producing gray to black vat dyes of the dibenzanthrone series which comprises subjecting a nitro dibenzanthrone compound of the group consisting of nitro-dibenzanthrone, nitro-dibenzanthronyls and nitro-isodibenzanthrones to reduction in alcoholic suspension, adding a caustic alkali to the reaction mass and heating to effect condensation of the resulting amino-dibenzanthrone to produce direct dyeing gray to black vat dyes.

2. The process for producing gray to black vat dyes of the dibenzanthrone series which comprises reducing a nitro dibenzanthrone compound of the group consisting of nitro-dibenzanthrones, nitro-dibenzanthronyls and nitro-isodibenzanthrones in alcoholic suspension with sodium sulfide, adding caustic alkali to the resulting mass and heating to effect condensation of the resulting amino-dibenzanthrone to produce direct dyeing gray to black vat dyes.

3. The process for producing gray to black vat dyes of the dibenzanthrone series which comprises reducing a nitro dibenzanthrone compound of the group consisting of nitro-dibenzanthrones, nitro-dibenzanthronyls and nitro-isodibenzanthrones in alcoholic suspension with sodium sulfide, adding caustic potash to the resulting mass, and heating to effect condensation of the resulting amino-dibenzanthrone to produce direct dyeing gray to black vat dyes.

4. The process for producing gray to black vat dyes of the dibenzanthrone series which comprises subjecting a nitro dibenzanthrone compound of the group consisting of nitro-dibenzanthrones, nitro-dibenzanthronyls and nitro-isodibenzanthrones to reduction in an alcoholic suspension, adding caustic potash and an oxidizing agent to the resulting mass and heating to effect condensation of the amino-dibenzanthrone to direct dyeing gray to black vat dyes.

5. The process for producing gray to black vat dyes of the dibenzanthrone series which compries reducing a nitro dibenzanthrone in alcoholic suspension with sodium sulfide, adding caustic potash to the resulting mass, and heating to effect condensation of the resulting amino dibenzanthrone to produce direct dyeing gray to black vat dyes.

6. The process for producing gray to black vat dyes of the dibenzanthrone series which comprises reducing nitro dibenzanthrone containing from 3.5 to 6.5% nitrogen in alcoholic suspension with sodium sulfide, adding caustic alkali to the resulting mass and heating to effect condensation of the resulting amino-dibenzanthrone to produce direct dyeing gray to black vat dyes.

7. The process for producing gray to black vat dyes of the dibenzanthrone series which comprises reducing nitro-Bz-1,Bz-1'-dibenzanthronyl containing from 3.5 to 6.5% nitrogen in alcoholic suspension with sodium sulfide, adding caustic alkali to the resulting mass and heating to effect condensation of the resulting amino-dibenzanthronyl to produce direct dyeing gray to black vat dyes.

8. The process for producing gray to black vat dyes of the dibenzanthrone series which comprises reducing nitro-2,2'-dibenzanthronyl containing from 3.5 to 6.5% nitrogen in alcoholic suspension with sodium sulfide, adding caustic alkali to the resulting mass and heating to effect condensation of the resulting amino-dibenzanthronyl to produce direct dyeing gray to black vat dyes.

EDWARD T. HOWELL.